United States Patent
Sacks et al.

(10) Patent No.: US 7,567,905 B1
(45) Date of Patent: Jul. 28, 2009

(54) METHOD FOR IDENTIFYING AND VERIFYING AN ELEMENT USING A VOICE SYSTEM

(75) Inventors: Jerry Dennis Sacks, Houston, TX (US); James Michael Parks, Richmond, TX (US)

(73) Assignee: Systems Application Engineering, Inc., Houston, TX (US)

( * ) Notice: Subject to any disclaimer, the term of this patent is extended or adjusted under 35 U.S.C. 154(b) by 319 days.

(21) Appl. No.: 11/625,507

(22) Filed: Jan. 22, 2007

(51) Int. Cl.
  *G10L 11/00* (2006.01)
  *G10L 15/00* (2006.01)
  *G10L 13/08* (2006.01)
  *G06Q 10/00* (2006.01)

(52) U.S. Cl. .................. 704/270; 704/231; 704/260; 705/28

(58) Field of Classification Search .................. None
  See application file for complete search history.

(56) References Cited

U.S. PATENT DOCUMENTS

| | | | |
|---|---|---|---|
| 5,410,141 A * | 4/1995 | Koenck et al. ......... 235/472.02 |
| 5,507,527 A * | 4/1996 | Tomioka et al. ............... 283/93 |
| 7,143,041 B2 * | 11/2006 | Sacks et al. ................. 704/270 |
| 2006/0180672 A1 * | 8/2006 | Chu ........................... 235/487 |
| 2007/0016460 A1 * | 1/2007 | Weiss ............................ 705/8 |
| 2007/0080930 A1 * | 4/2007 | Logan et al. ................ 345/156 |
| 2008/0142590 A1 * | 6/2008 | Ainasoja ..................... 235/385 |

OTHER PUBLICATIONS

Hansell, "Amazon Ships to a Sorting Machine's Beat", The New York Times, Jan. 21, 2002.*

* cited by examiner

*Primary Examiner*—David R Hudspeth
*Assistant Examiner*—Brian L Albetalli
(74) *Attorney, Agent, or Firm*—Buskop Law Group, PC; Wendy Buskop

(57) ABSTRACT

An identification and verification method for identifying and verifying an element. The method uses a voice system. The method includes the steps of associating at least one of an at least 4 unit area character matrix with an element. The at least 4 unit area character matrix comprises at least one character. With the method, a computer system with at least one processor is used to request a specific character identification set.

35 Claims, 3 Drawing Sheets

METHOD FOR IDENTIFYING AND VERIFYING AN ELEMENT USING A VOICE SYSTEM

FIELD

The present embodiments relate generally to a method for identifying and verifying an element, such as a location, a transport vehicle, a piece of equipment, or an inspection item, using a voice system.

BACKGROUND

In warehouses, manufacturing plants, transportation industries, or other industries requiring identification and verification of elements to be acted upon, there exists a need for a method for accurately verifying, using a voice system, that a system user is in a desired location, that a desired element can be loaded, that the desired element has been placed on a pallet, and that the desired element is being shipped.

There also exists a need for accurately identifying and verifying that a person is in a correct zone or a similar correct location, in a manufacturing plant, oil field, production facility, or warehouse.

There further exists a need for a method for identifying and verifying, using a voice system, several pieces of information such as, a user is at a correct location, a correct transport vehicle is being used, and the desired element has been identified and acted upon.

Acting upon a desired element can include picking the element, selecting the element, placing the element in a place, moving the element from a place, storing the element in a place, loading an element into a selected transport vehicle, unloading an element from the transport vehicle, letting the element down from a specific area or storage unit, putting the element into a specific storage unit or area, counting elements, cross-docking the element from or to a specific area, staging the element in a specific area, gathering data on the element, or performing an inspection on the element.

There are various loading, transporting, and moving acts that need a person carrying out the required actions to identify and to verify that the correct actions are being performed in the correct location or on the correct item to save time, save money, on labor costs, save on returns of items, and increase the efficiency of the process.

The present embodiments meet these needs.

BRIEF DESCRIPTION OF THE DRAWINGS

The detailed description will be better understood in conjunction with the accompanying drawings as follows.

Figure 1:
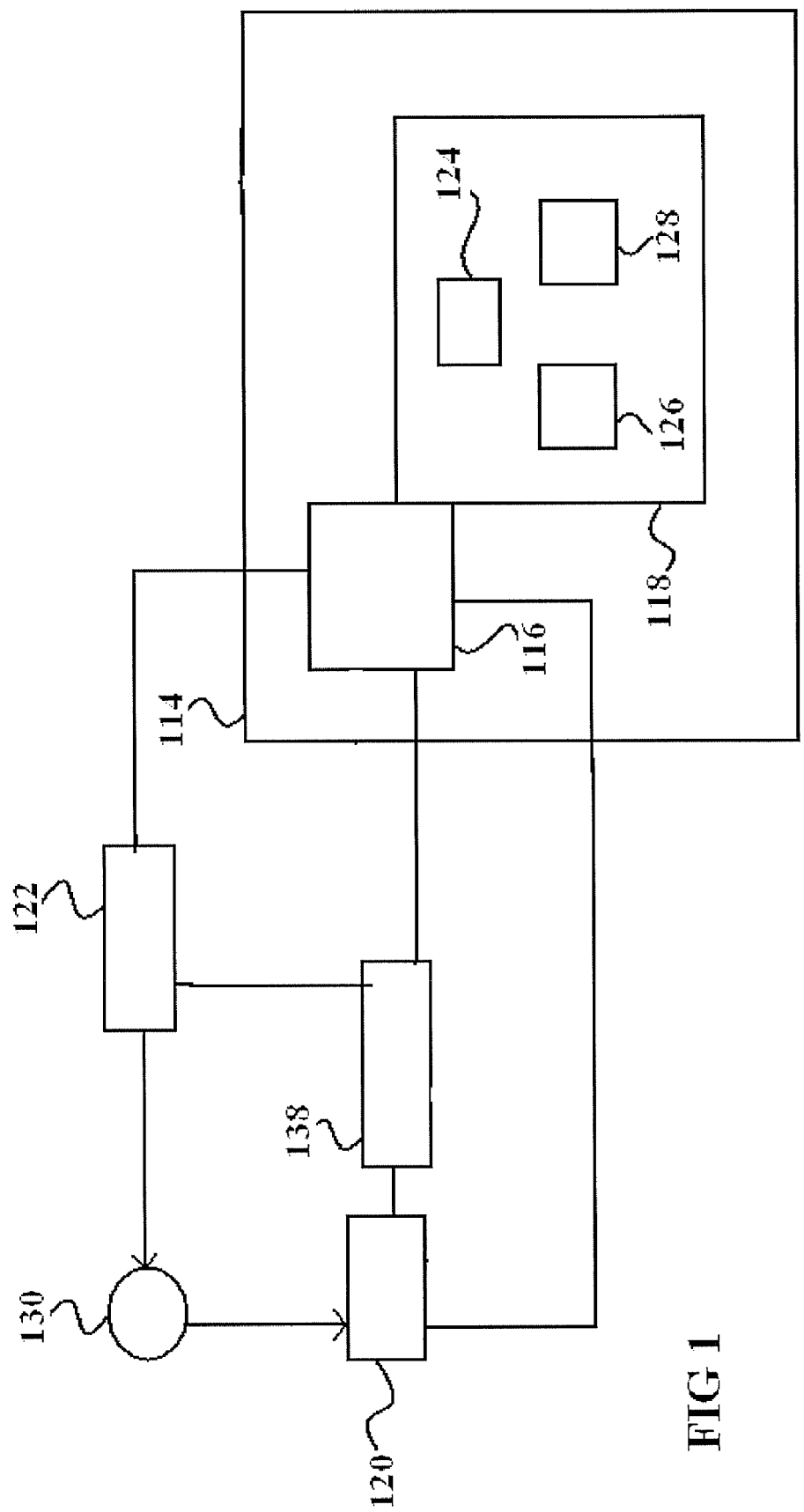
FIG. 1 depicts an embodiment of a computer system useable with this method.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

An embodiment of the invention generally relates to a method for identification and verification using a voice system and at least one of an at least 4 unit area character matrix, a computer system, an input device, an output device, data storage, text to speech computer instructions, and voice recognition computer instructions.

At least one specific character identification set of the at least 4 unit area character matrix is associated with an element.

An element can be a product, such as a case of soda; an item, such as a car; a material, such as sheet metal; a person, such as a passenger on a cruise ship; a user, such as a person belonging to a specific network; a transport vehicle, such as a cargo van; an object, such as a pallet; a box, such as a moving box; a piece of equipment such as a compressor or a press; an inspected item, such as a brake; a vehicle, such as a forklift; oil in a vehicle, a fire extinguisher, or other similar tangible things used in manufacturing, warehousing, shipping, transportation, retail sales, or other substantially similar industries.

The method can be used in a warehouse and loading venue moving over 125,000 items per day.

In an embodiment of the method, multiple elements can be identified using different unit area character matrices with different specific character identification sets. It is preferred that adjacent unit area character matrices, disposed on associated elements, have differing specific character identification sets.

Embodiments of the method save money and time by ensuring that the correct elements are acted upon correctly, in a manner that includes verification of the identified element ensuring that system users are in correct locations, or that the correct equipment or devices are being used.

Embodiments of the method reduce costs associated with identification and verification of desired elements. The at least 4 unit area character matrix create multiple specific character identification sets that cannot be memorized by workers, eliminating the need to continuously change the specific character identification set labels. This makes the identification and verifying process more accurate and efficient and reduces waste associated with the changing of specific character identification sets.

An embodiment of the method can also be used to provide added security and accuracy by providing multiple requests for specific character identification sets before the voice system instructs the system user as to the required action.

The embodiments of the identification and verification method can be incorporated with security systems, such as logon security for accessing a computer network or identification information for accessing banking information or other personal information stored on a data base.

The use of multiple specific character identification sets would significantly enhance the identification of the user, thereby, improving the accuracy and the security of the identification process.

An embodiment of the method of verifying and identifying the system user or an element using a voice system includes the act of associating at least one of an at least 4 unit area character matrix with the system user or an element. At least one unit area of the at least 4 unit area character matrix is used to identify the element.

An embodiment of the method further includes using a computer system, which can include a processor with data storage. In an embodiment of the method, the identification and verification system can include two processors with data storage.

The computer system can be connected to an input device so that the system user can provide data to the processor. The computer system can have an output device, so that the computer system can communicate with the system user.

The computer system can also have instructions stored in the data storage. The computer instructions can include text to speech computer instructions, voice recognition computer instructions, which can be trainable to the voice of a person, and a character associated with each of the unit areas of the at least 4 unit area character matrix.

The computer system can indicate, through the output device, a first set of output instructions.

The first set of output instructions should instruct a person to locate a specific character identification set from the characters associated with each unit area of the at least 4 unit area character matrix.

Once the specified character identification set is located, the person should do the act of providing the located specific character identification set to the computer system using the input device.

The computer system can perform the act of verifying that the provided specific character identification set matches the specific character identification set requested in the first set of output instructions. This is accomplished by a set of instructions programmed into the computer system and preferably stored in the data storage.

The computer system can then do the act of providing additional output instructions concerning the element, the system user, or combinations thereof.

For example the computer system, such as the one depicted below in FIG. 1, or a substantially similar computer system, can generate a request for a system user to locate a specific character identification set using characters associated with the at least 4 unit area character matrix.

The system user would go to the place where the element associated with the at least 4 unit area character matrix and a written display of the at least 4 unit area character matrix is located.

The system user would observe the specific character identification set requested and speak the requested specific character identification set into the input device, which is connected to the computer system. The connection can be a wireless connection, a wire connection, or a network connection to the computer system.

The computer system would then perform the act of verifying that the specific character identification set that was provided by the system user is the same as the requested specific character identification set.

An embodiment of the method can also include the act of the computer system using the output device to request an additional specific character identification set, and the system user providing the additional requested specific character identification set using the input device.

The computer system can also perform the act of providing additional output instructions to the system user, such as load the element located, identify a new element, identify a new location, or instruct the system user to perform another act commonly done in industry.

The embodiments of the identification and verification method relate to an identification and verification system for identifying an element using a voice system. The identification and verification system can include at least one at least 4 unit area character matrix.

An embodiment of the identification and verification system can include a computer system, which includes a processor with data storage, such as a memory card.

The computer system can also be connected to an input device. The computer system can also include an output device.

It is contemplated that the identification and verification system can include one or more processors with data storage.

The data storage can contain a plurality of computer instructions. The plurality of computer instructions can include operating code, text to speech computer instructions, characters associated with one of the at least 4 unit area character matrix, computer instructions for associating each of the at least 4 unit area character matrices with an element, output instructions for requesting a specific character identification set from characters associated with the at least 4 unit area character matrix, and verification instructions for verifying that a provided specific character identification set matches a requested specific character identification set.

The specific character identification set can be requested randomly by the computer system. The computer instructions could instruct the computer system to randomly combine the characters associated with the at least 4 unit area character matrix each time the element associated with the at least 4 unit area character matrix needs to be identified and verified.

For example, the first time an associated element needs to be identified and verified the computer system could randomly combine two characters associated with the top two unit areas in the top row of the associated at least 4 unit area character matrix to form a first specific character identification set.

The next time the associated element needs to be identified, the computer system could randomly combine the characters associated with the top right unit area and the character associated with the bottom left unit area of the associated at least 4 unit area character matrix, forming a second specific character identification set, and so forth each time the associated element needs to be identified.

The computer system can further include voice recognition computer instructions and verification computer instructions for matching the specific character identification set that the system user provides to the randomly requested specific character identification set.

In an embodiment of the computer system, the data storage can have additional instructions, such as computer instructions for translating inputs from the input device into another language.

The system can be better understood with reference to the figures.

Referring flow to FIG. 1, the computer system 114, includes a processor 116, such as a Pentium III™ processor; a portable digital assistant; a handheld mobile computer, such as model number MC 9090-SH0HJAFA6WW from Symbol Technologies, Inc, or other similar devices also available from Symbol technologies, Inc, Intermec Corporation, or LXE; a laptop; a vehicle mounted computer; a wearable computer, such as Symbol Technologies WT 4000 Series; a mainframe, a desktop personal computer, such as a computer sold by Dell Corporation, or another similar device.

The computer system 114 has data storage 118, such as a memory card, or the computer memory.

The computer system also has the processor 116 connected to an input device 120, such as an INTRI-CON Resistance Technologies, product number SH09-3748, or a similar headset; a keyboard; a joystick; a touch input device, such as a touch screen; a microphone, or another communication device adapted for use with the computer system 114.

The connection of the input device 120 can be by wiring the input device 120 to the processor 116, by wirelessly connecting the input device 120 to a network 138 that is in communication with the processor 116, or by wirelessly connecting the processor 116 to the input device 120.

The network 138 can be a local area network, the internet, a wireless network, or a wide area network. An exemplary network, would be a Spectrum 24 Wireless Network from Symbol Technologies, Inc.

The computer system 114 also has the processor 116 connected to an output device 122, such as a speaker, a touch output device, a display, a headset, a earpiece, a transmitter, a printer, or another substantially similar communication device adapted for use with the computer system 114. The connection of the output device 122 can be connected to the processor 116 in a substantially similar way as the input device 120.

The data storage 118 includes a plurality of computer instructions, the plurality of computer instructions can include text to speech computer instruction 126, such as, Scansoft Inc.'s Mobile RealSpeak Compact, voice recognition computer instructions 128; such as the Handheld Speech Voice Recognition Software available from Handheld Speech LLC, or other similar commercially available speech recognition software; and computer instructions 124 for associating each of the at least 4 unit area character matrices and outputting to the system user 130.

Additional data can be stored in the data storage 118. For example, the data storage 118 can include the characters associated with each at least 4 unit area character matrix; verification computer instructions, for matching an inputted specific character identification set associated with the at least 4 unit area character matrix to a requested specific character identification set associated with an element, operating code, and randomization computer instructions for randomizing the order in which specific character identification sets are requested.

The outputting can be accomplished by displaying a requested specific character identification set from the at least 4 unit area character matrix on a digital display, or using the text-to-speech computer instructions 126 to communicate the requested specific character identification through the output device 122.

Figure 2:
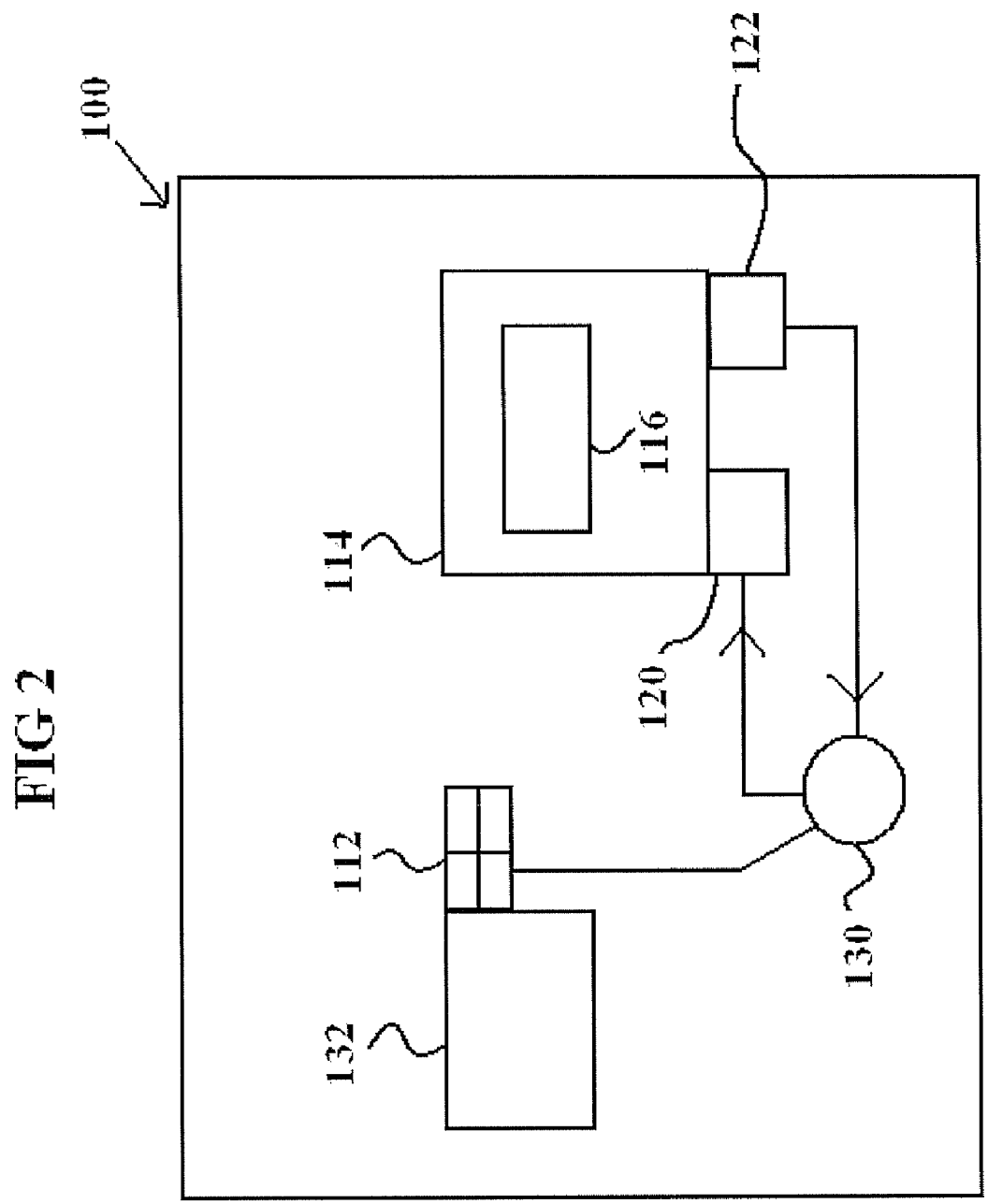
FIG. 2 depicts an embodiment of the verification system useable with this method.

Referring now to FIG. 2, which depicts an embodiment of the identification and verification system 100. The identification and verification system 100 has an element 132; a 4 unit area character matrix 112, such as the embodiment of the 4 unit character matrix 112 depicted in FIG. 3; a computer system 114; such as the computer system 114 depicted in FIG. 1.

The computer system 114 can possess a processor 116, an input device 120, and an output device 122, as shown in FIG. 1.

The at least 4 unit area character matrix 112 can be physically attached to the element 132, or otherwise indicated on the element 132.

The identification and verification system 100 also has a system user 130. The system user 130 can be a worker, a truck driver, a loader, or other person who would be performing a task on, with, or using the element 132.

The system user 130 communicates with the processor 116, by using the input device 120 and the output device 122, which are connected to the processor 116 and accessible to the system user 130 when the system user 130 is at the element 132 that the system user 130 was instructed to locate.

A print out or other physical, electronic, digital, or other form of display of the at least 4 unit area character matrix 112 is located proximate to or on the associated element 132. For example, the at least 4 unit area character matrix 112 can be posted on a storage rack, posted on the element 132, or displayed in an area where the associated element 132 is stored.

Figure 3:
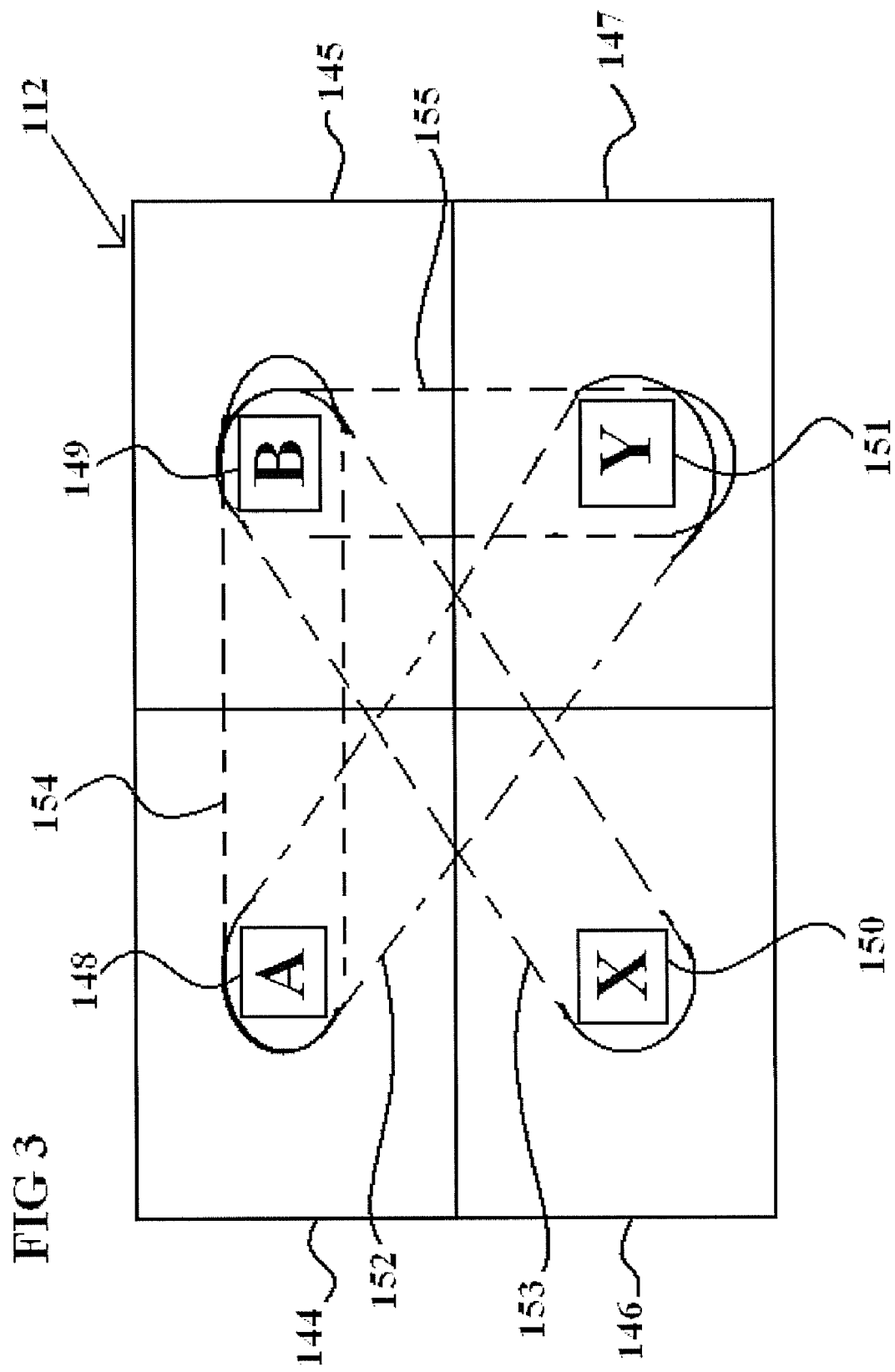
FIG. 3 depicts an embodiment of a 4 unit area matrix usable with this method.

The system user 130 can receive instructions from the processor 116 through the output device 122, and input requested information such as a specific character identification set, an example of which is depicted in FIG. 3, through the input device 120.

FIG. 3 is an embodiment of the at least 4 unit area character matrix 112. The at least 4 unit area character matrix 112 can have four areas 144, 145, 146, and 147. Characters 148, 149, 150, and 151 are each associated with one of the four areas 144, 145, 146, and 147 respectively.

The characters can be check digits, such as numeric characters, alpha characters, Greek symbols, Chinese characters, other defined symbols, or combinations thereof.

A specific character identification set is formed by combining the characters 148, 149, 150, and 151 into a plurality of groups. For example, a first specific character identification set 152, can include characters 148 and 151, while a second specific character identification set 153 can include characters 149 and 150.

Yet a third specific character identification set 154 can include characters 148 and 149. A fourth specific character identification set 155 can include characters 149 and 151.

The computer system could randomly request one of the specific character identification sets using the computer instructions stored in the data storage.

For example, the computer system can request the specific character identification set by requesting in order the character associated with the top right area 145 and then the character associated with the bottom right area 147, which would form the fourth specific character identification set 155.

It is clear that the order in which the characters associated with each area are requested could be inversed to create an additional specific character identification set.

For example instead of the above request the computer system could request through the output device the character associated with the bottom right area 147 and then the character associated with the top right area 145, which would use the same characters as the fourth specific character identification set but the characters would be requested in reverse order creating a new specific character identification set.

Additional specific character identification sets can be created by further combining characters in different groupings. As the number of unit areas in a matrix are increased, the number of possible character sets increases. The number of unit areas in a unit area character matrix can have an infinite range, but in a typical embodiment, the range is from about 4 unit areas to 36 unit areas.

While these embodiments have been described with emphasis on the embodiments, it should be understood that within the scope of the appended claims, the embodiments might be practiced other than as specifically described herein.

What is claimed is:

1. An identification and verification method for identifying and verifying an element using a voice system to prevent memorization of an item identification by a system user, comprising the acts of:

associating at least one of an at least 4 unit area character matrix with an element, wherein the at least 4 unit area character matrix comprises at least one character;

using a computer system comprising: at least one processor comprising data storage, a connection to an input device, and a connection to an output device; computer instructions in the data storage comprising text to speech computer instructions, voice recognition computer instructions, computer instructions associating characters with the at least one at least 4 unit area character matrix;

indicating, through the output device, first output instructions that a system user locate at least one specific character identification set comprised of at least one character in the at least one 4 unit area character matrix, wherein the at least one specific character identification set is one of multiple specific character identification sets for use in the at least one 4 unit area character matrix, and wherein the at least one specific character identification set is selected randomly from the multiple specific character identification sets;

requesting the system user verify at least one character by location in the at least one 4 unit matrix for the element, and randomizing additional specific character identification sets for the element for subsequent identification and verification;

providing a located specific character identification set to the computer system using the input device;

using the computer system to verify that the located specific character identification set matches the specific character identification set requested in the first output instructions; and proceeding with additional instructions concerning the element, the system user, or combination thereof.

2. The method of claim 1, wherein the verifying comprises providing second output instructions requesting at least one additional specific character identification set to the system user using the output device, and the system user providing to the computer system using the input device, the at least one additional specific character identification set from the at least 4 unit area character matrix associated with the system user or element.

3. The method of claim 1, wherein the output device is an audio output device, a touch output device, a display, or a printer.

4. The method of claim 1, wherein the input device is a keyboard, a joystick, a touch screen, or an audio input device.

5. The method of claim 1, wherein the voice recognition computer instructions are trainable to the voice of the system user.

6. The method of claim 1, wherein the computer system comprises at least two processors each with data storage.

7. The method of claim 1, wherein the computer system is a networked computer system with a network selected from the group consisting of: a local area network, internet, a wireless network, a wide area network, and combinations thereof.

8. The method of claim 1, wherein the input device is a wearable audio input device.

9. The method of claim 1, wherein the processor with data storage is a member of the group consisting of: a portable digital assistant, a handheld mobile computer, a laptop, a wearable computer, a vehicle mounted computer, a desktop computer, a personal computer, a mainframe, and combinations thereof.

10. The method of claim 1, wherein the at least one at least 4 unit area character matrix comprises unit areas formed in row-column patterns.

11. The method of claim 10, wherein the at least one at least 4 unit area character matrix comprises from 4 unit areas to 36 unit areas.

12. The method of claim 10, wherein the characters associated with the at least one at least 4 unit area character matrix are check digits.

13. The method of claim 12, wherein the check digits are selected from the group consisting of: alpha characters, numeric characters, Chinese characters, Greek symbols, and combinations thereof.

14. The method of claim 1, wherein the element is selected from the group consisting of: an area, a zone, an object, a transport vehicle, a person, a machine, a piece of equipment, an inspection item, or an animal.

15. The method of claim 1, wherein the multiple specific identification sets associated with the at least one 4 unit area character matrix comprises a second specific character identification set within the at least 4 unit area character matrix different from the remaining specific identification sets of the multiple specific identification sets.

16. The method of claim 1, wherein adjacent at least 4 unit area character matrices comprise specific character identification sets that differ from each other.

17. The method of claim 1, further comprising computer instructions for translating inputs from the input device to another language.

18. The method of claim 1, wherein the output device provides at least one short command to the system user.

19. An identification and verification system for identifying and verifying an element using a voice system to prevent memorization of an item identification by a system user, comprising:

at least one of an at least 4 unit area character matrix;

a computer system comprising a processor with data storage connected to an input device for use by a system user, and an output device in communication with the system user;

computer instructions in the data storage comprising, text to speech computer instructions; voice recognition computer instructions; characters associated with the at least one at least 4 unit area character matrix; and verification computer instructions for matching an inputted specific character identification set associated with the at least one at least 4 unit area character matrix to a requested specific character identification set associated with an element, wherein the requested specific character identification set is one of multiple specific character identification sets in the at least one 4 unit area character matrix, and wherein the requested specific character identification set is selected randomly from the multiple specific character identification sets; and computer instruction for requesting the system user verify at least one character by location in the at least 4 unit matrix for the element, and randomizing additional specific character identification sets for the same element for subsequent identification and verification.

20. The identification and verification system of claim 19, further comprising computer instructions for randomly selecting the requested specific character identification set.

21. The identification and verification system of claim 19, wherein the output device is an audio output device, a display, a touch output device, or a report.

22. The identification and verification system of claim 19, wherein the input device comprises a keyboard, a joystick, a touch screen, an audio input device, a graphical user interface, and combinations thereof.

23. The identification and verification system of claim 19, wherein the voice recognition computer instructions are trainable to the voice of the system user.

24. The identification and verification system of claim 19, wherein the computer system comprises at least 2 processors each with data storage.

25. The identification and verification system of claim 19, wherein the computer system is a networked computer system with a network selected from the group consisting of: a local area network, internet, a wireless network, or a wide area network.

26. The identification and verification system of claim 19, wherein the input device is a wearable audio input device.

27. The identification and verification system of claim 19, wherein the processor with data storage is a member of the group consisting of: a portable digital assistant, a handheld mobile computer, a laptop, a wearable computer, a vehicle mounted computer, a desktop computer, a personal computer, or a mainframe.

28. The identification and verification system of claim 19, wherein the at least one at least 4 unit area character matrix comprises unit areas formed in row-column patterns.

29. The identification and verification system of claim 19, wherein the at least one at least 4 unit area character matrix comprises from 4 unit areas to 36 unit areas.

30. The identification and verification system of claim 19, wherein the characters associated with the at least one at least 4 unit area character matrix are check digits.

31. The identification and verification system of claim 30, wherein the check digits are selected from the group consisting of: alpha characters, numeric characters, Chinese characters, Greek symbols, and combinations thereof.

32. The identification and verification system of claim 19, wherein the element is selected from the group consisting of: an area, a zone, an object, a transport vehicle, a person, a machine, a piece of equipment, an inspection item, or an animal.

33. The identification and verification system of claim 19, wherein each of the at least one 4 unit area character matrices comprise at least two requested specific character identification sets.

34. The identification and verification system of claim 33, wherein the at least two requested specific character identification sets within the at least 4 unit area character matrix differ from each other.

35. The identification and verification system of claim 19, wherein adjacent at least 4 unit area character matrices comprise character identification sets that differ from each other.

* * * * *